ns Patent [19]
Arnold

[11] 4,081,954
[45] Apr. 4, 1978

[54] CLEVIS

[76] Inventor: Lee Fern Arnold, Clayton, Kans. 67629

[21] Appl. No.: 807,573

[22] Filed: Jun. 17, 1977

Related U.S. Application Data

[63] Continuation-in-part of Ser. No. 736,093, Oct. 27, 1976, abandoned.

[51] Int. Cl.² .................... F16G 15/04; F16C 11/06
[52] U.S. Cl. ................................. 59/86; 24/241 R; 403/159
[58] Field of Search ............ 403/157, 159, 154, 149, 403/145, 119, 120; 24/241 SL, 241 TC, 233, 234, 241 R, 230 A, 230 VU, 241 PP; 59/86, 87, 88, 89, 93

[56] References Cited

U.S. PATENT DOCUMENTS

| 28,126 | 5/1860 | Coleman | 24/241 SL |
| 220,878 | 10/1879 | Shiflett | 403/159 |
| 396,819 | 1/1889 | Hubbell | 24/234 |
| 1,406,911 | 2/1922 | Tarner | 24/233 |
| 1,584,307 | 5/1926 | King | 24/234 |
| 2,197,881 | 4/1940 | Seabo | 59/89 |
| 2,234,853 | 3/1941 | Brueggeman | 24/234 |
| 2,249,238 | 7/1941 | Gilmore | 59/93 |
| 2,605,529 | 8/1952 | Gray | 59/89 |
| 2,761,190 | 9/1956 | Ritter | 24/234 |

Primary Examiner—C.W. Lanham
Assistant Examiner—Gene P. Crosby
Attorney, Agent, or Firm—T. Reid Anderson

[57] ABSTRACT

A clevis shackle having a locking pin spring-loaded to span and normally close the shackle area of the clevis.

5 Claims, 7 Drawing Figures

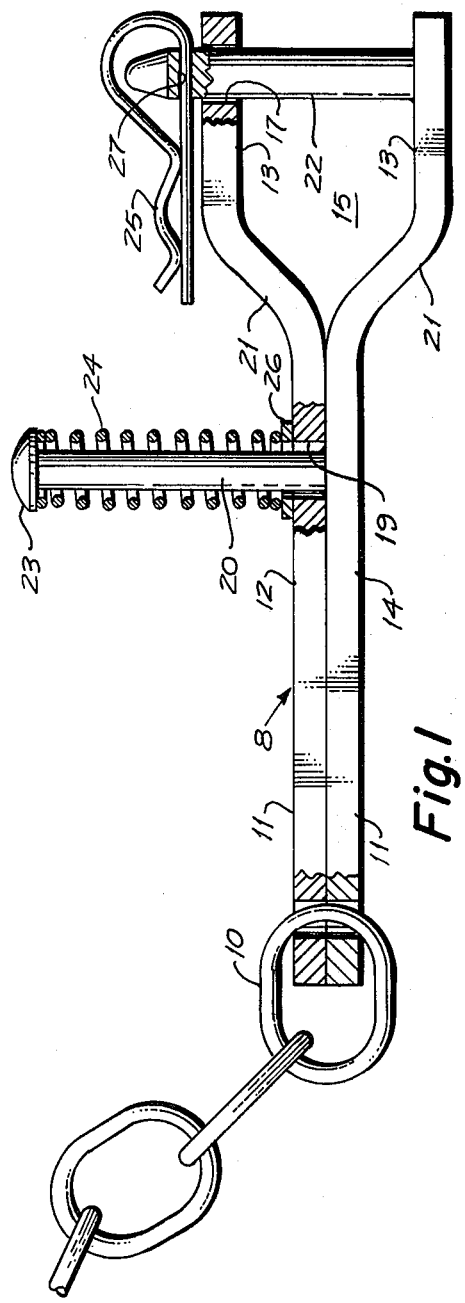
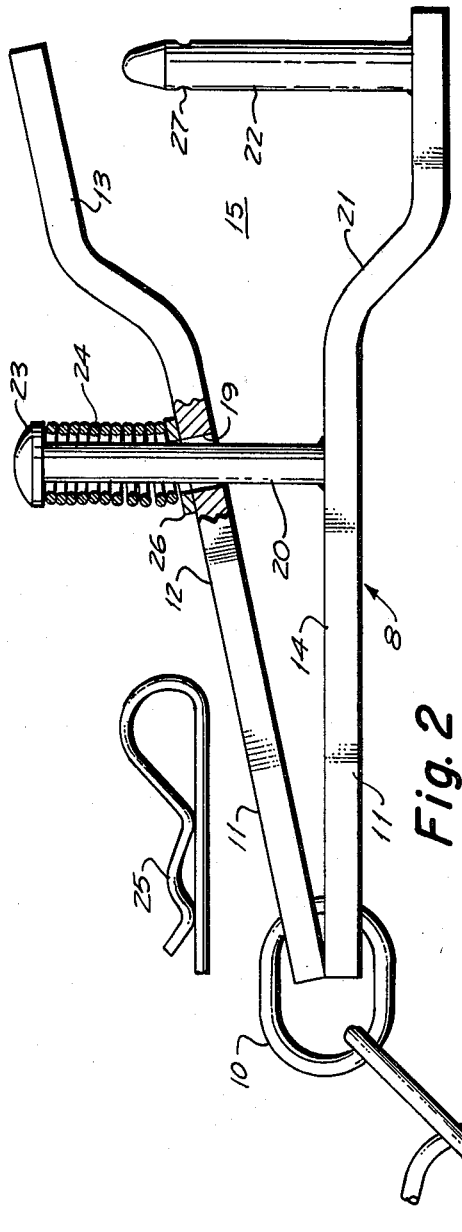
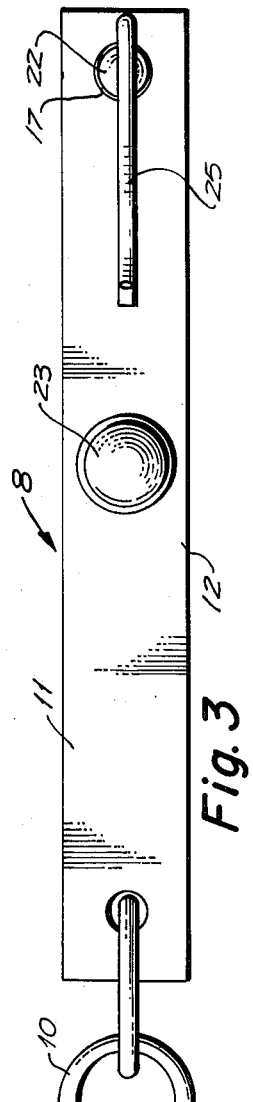
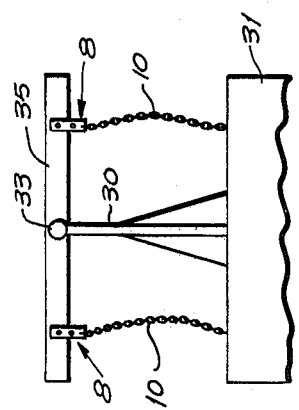

CLEVIS

This is a Continuation-In-Part application of copending Ser. No. 736,093, filed Oct. 27, 1976, now abandoned.

BACKGROUND AND DESCRIPTION OF THE INVENTION

This invention relates to a useful improvement in coupling devices and more particularly to a spring-loaded, quick-coupling clevis especially suitable for fastening a safety chain of a trailing structure, for example, either mechanized equipment or house trailer to the draw bar of a tractor, pick-up truck or car.

Because of the danger of trailers becoming detached from the pulling vehicle, state governments require auxiliary safety attachments when a trailer is being pulled. Various practices have been resorted to to meet this safety requirement which usually involves chains, the coupling of which are too often awkwardly accomplished and time consuming in completion; most often hand tools are needed.

Accordingly, it is one object of the invention to provide a reliable clevis for coupling a safety chain of a trailing structure to the prime mover which clevis does not require tools for coupling and decoupling.

Another object of the invention is to provide an improved clevis structure of simple design, the locking pin of which has a normally closed position and which is not subject to dislodgement by blow or road jarring.

Other objects and features of the invention will become apparent from a reading of the following description and claims.

Figure 5:
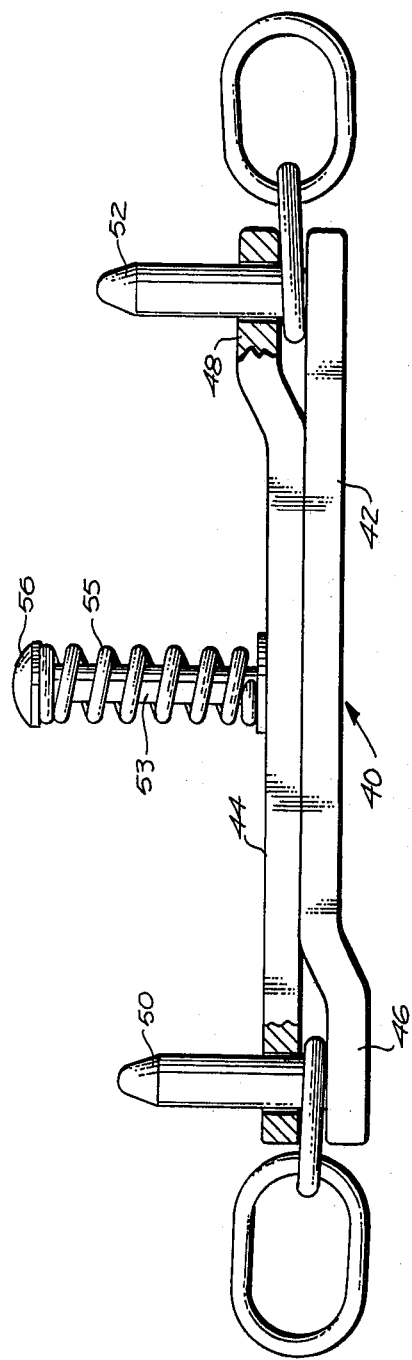
Figure 6:
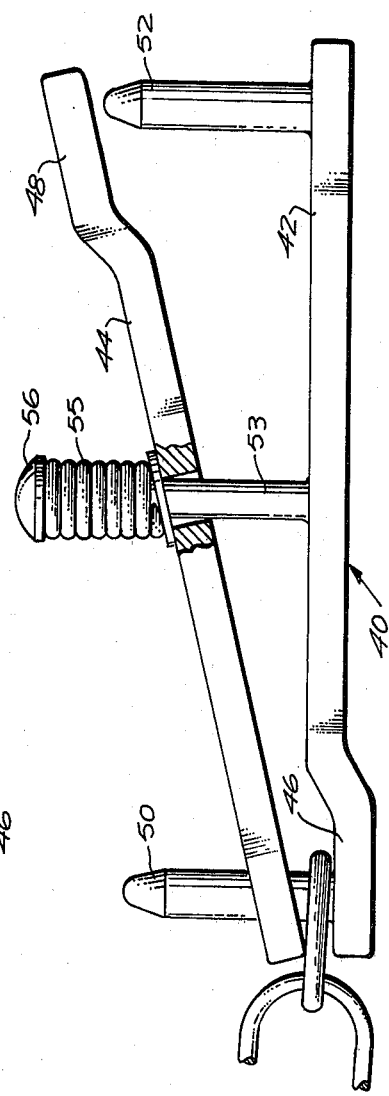
Figure 7:
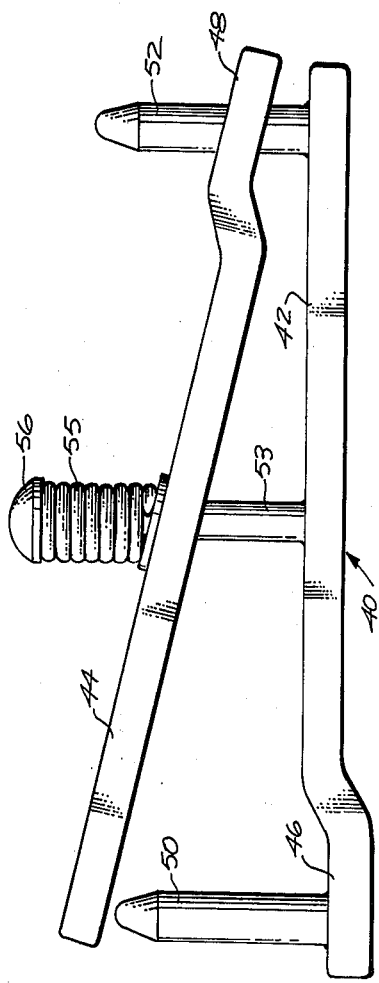

In the accompanying drawings together with the specification, there is illustrated a preferred embodiment of the invention, in which drawings FIG. 1 is an elevational view, partially cutaway, of the spring-loaded clevis of the invention, showing the device in its closed position, FIG. 2 is another elevational view illustrating the device in its open position, FIG. 3 is a planned view of the clevis of FIG. 1, FIG. 4 is a fragmentary plan view of a trailing device coupled to the draw bar of a pulling vehicle with two safety chains on opposite sides of the trailer hitch which safety chains utilize the clevis of the invention, FIG. 5 is an elevational view of another embodiment of the clevis of the invention which has a shackle arrangement at each of its opposite ends, and FIGS. 6 and 7 are side views of the two shackle clevis of FIG. 5 with different ones of the shackles open in the respective figures.

The clevis of the invention utilizes a locking bolt or pin which is spring-loaded to a closed position, spanning the usual shackle area. The clevis comprises a pair of narrow, elongated metal straps, each having a stem portion and a parallel offset segment with the parallel segments of the two straps in the assembled clevis being offset in opposite directions to define a general U-shaped shackle area. The offset segment of one of the straps has a perpendicularly-located elongated locking pin spanning the shackle area and extending through an aligned hole of the offset segment of the other strap. A spring-loaded closing means urges the stem portions of the two straps into flat engagement which is the usual closed, first position of the clevis. The straps may be moved against the force of the spring into a second position, wherein the locking pin is moved away from the opposing offset segment, thus providing a disengagement gap within the shackle area; this is the open position of the clevis. In a preferred embodiment of the clevis the spring-loaded closing means includes a centering pin which is perpendicularly-located on the stem portion of one of the two straps with the centering pin extending through an aligned hole of the stem portion of the other strap. A coil spring is located about the length of the centering pin, urging the two stem portions into flat engagement.

Referring to FIGS. 1–3, it is seen that the clevis 8 is formed of two narrow elongated steel straps 12, 14. Each of the two straps 12, 14 has a long stem portion 11 which terminates in a shorter parallel offset segment 13 with the parallel segments 13 of the respective two straps in the assembled clevis being offset in opposite directions to provide a general U-shaped shackle area 15 therebetween.

In the embodiment illustrated, the first steel strap 12 has a first hole 17 adjacent the outer end of the offset segment 13 and a second hole 19 through the stem portion 11 adjacent the outwardly-bent juncture 21 of the stem portion and offset segment. The strap holes 17 and 19 desirably depart slightly from the circular to provide oblong openings fore and aft which assures there will be no binding of pins 20 and 22 with the relative movement of the straps. The second strap 14 has a centering pin 20 perpendicularly-fixed to its stem portion which pin extends through the aligned second hole 19 of the first strap 12. A locking pin 22 is perpendicularly-fixed to the offset segment of the second strap 14; the locking pin 22 is in alignment with the first hole 17 of the offset segment 13 of the first strap 12 in the assembled clevis.

The centering pin 20 has at its outer end an enlarged head 23. A coil spring 24 is disposed between the centering pin head 23 and the outer face of the first strap 12, thus serving to urge the two metal straps 12, 14 into flat engagement in a first clevis position of FIG. 1. A washer 26 at the base of the spring 24 forestalls engaging of the spring and strap hole 19. It will be seen that when the stem portions 11 of the two steel straps are in flat engagement, the locking pin 22 extends through the aligned hole 17 of the offset segment 13 of the first strap 12. In the closed clevis position of FIG. 1, a clip 25, is positioned in a transverse hole 27 of the outer end of the locking pin 22; the clip 25 is a precautionary measure as the structure with the spring loading arrangement normally occupies the closed, first position of FIG. 1 and it would only be in the unlikely event of spring failure that the locking pin 22 would not close the shackle disengagement gap.

When it is desired to move the clevis into its open, second position, the two steel straps 12, 14 are moved apart against the force of the spring 24 as seen in FIG. 2. With the open second position of the clevis, the offset segments of the two steel straps are moved apart and the locking pin 22 moves out of the hole 17, away from the opposing offset segment of the other strap to provide a disengaging gap within the shackle area 15 as best seen in FIG. 2. With release of the spreading force, the pin 22 under the force of the spring 24 returns to the closed clevis position of FIG. 1. A link of chain 10 provides the coupling means for holding the free ends of the steel strap stems together.

The drawing of FIG. 4 illustrates a manner of using the clevis 8 of the invention and there is illustrated a tongue 30 of a trailer 31 fastened through a hitch 33 to a draw bar 35 of a pulling vehicle (not shown) with safety chains 10 on opposite sides of the tongue 30 connecting the trailer 31 to the draw bar 35. Each chain 10 is connected through the quick-release clevis 8 of the invention to the draw bar.

The clevis of FIGS. 1–3 may take various dimensions which are selected to fulfill the particular need. In a typical clevis the metal straps are formed of a mild steel ¼ inch thick, 1¼ inch wide and 9 inches long. The locking pin 22 has a diameter of ½ inch and a length of 3 inches. The centering pin is 3 inches long and has a diameter of about ⅜ inch. The coil spring 24 is desirably cadmium plated and is approximately 3 inches long with a diameter of ½ inch. An adequate spring working pressure is in the range of 6 to 10 pounds. The size of the shackle area 15 may be varied to meet the needs of the particular application. The coil spring 24 is desirably sized to hold the clevis in an initial closed position, thus minimizing chattering that might occur with a lighter, shorter spring which supplies only that force needed to oppose the full clevis opening but providing no initial resistance, i.e. it is preferred that the clevis assemblage be under spring pressure at all times.

Another form of the clevis of the invention is illustrated in FIGS. 5–7; this embodiment 46 provides a shackle at each end of the engaging straps. Either shackle of the clevis 40 may be opened but only one at a time.

It is seen in FIGS. 5–7 that the clevis 40 is formed of two narrow elongated steel straps 42, 44 with each of the two straps having a long straight stem portion which terminates in a shorter parallel offset segment 46, 48 positioned at opposite ends of the clevis to form two shackle areas. In the particular embodiment illustrated, locking pins 50 and 52 are perpendicularly positioned at the opposite ends of the lower strap 42. It will be seen that the locking pin 50 is carried by the offset segment 46 while the second locking pin 52 is located at the far outer end of the stem of the strap 42 in alignment with a hole of the offset segment 48 of the upper strap 44. The first locking pin 50 extends through a hole at the free outer end of the stem of the upper strap 44.

The lower strap 40 centrally of its length carries a perpendicular centering pin 53 which pin extends through an aligned hole of the upper strap 44, centrally of its length. The centering pin 53 has at its outer end an enlarged head 56. A coil spring 55 is disposed between the centering pin head 56 and the outer face of the top strap 44, thus serving to urge the two metal straps 42 and 44 into flat engagement in a fully closed clevis position of FIG. 5. A washer at the base of the spring 55 forestalls interlocking of the spring with the strap hole. It will be seen that when the stem portions of the two steel straps 42, 44 are in flat engagement, the locking pins 50, 52 at the opposite ends of the clevis extend through the aligned holes of the other strap, thereby closing the two shackles.

When it is desired to open either of the shackles at the opposite ends of the clevis 40, the offset segment 46 or 48 at the appropriate shackle is moved away from the adjacent strap, thus causing the associated locking pin to move out of the closure hole, away from the opposing strap to provide a disengaging gap as seen in FIGS. 6 and 7.

I claim:

1. A clevis comprising:

a pair of narrow metal straps, each having a stem portion with at least one strap having a parallel offset segment defining a shackle area therebetween;

one of said straps having an elongated, perpendicular locking pin spanning the shackle area and extending through an aligned hole of the other strap in a first closed position of the clevis;

spring-loaded closing means urging the two straps into the first position with the stem portions in flat engagement;

said straps being moveable against the force of the spring into a second position, wherein the locking pin moves away from said other strap to provide a disengagement gap within the shackle area; and means movably coupling the stem portions of the metal straps together.

2. A clevis in accordance with claim 1 wherein the spring-loaded closing means includes a centering pin perpendicularly-located on the stem portion of one of the two straps with the centering pin extending through an aligned hole of the stem portion of the other strap, and a coil spring about the length of the centering pin with the coil spring at one of its ends abutting the stem of said other strap and at its other end engaging an enlarged head of the centering pin, said coil spring serving to urge the two stem portions together.

3. A clevis in accordance with claim 1 wherein the pair of metal straps has like shackle areas at its opposite ends.

4. A clevis in accordance with claim 1 wherein the coupling means comprising a chain with a link of the chain extending through aligned holes at the outer ends of the respective stem portions of the two metal straps.

5. A clevis comprising:

a first narrow metal strap having a straight stem portion terminating in a parallel, offset segment with a first hole therethrough adjacent its outer end and a second hole through the stem portion;

a second narrow metal strap having a straight stem portion terminating in a parallel, offset segment, the segments of the two straps being offset in opposite direction so as to provide a general U-shaped shackle area therebetween;

said second strap having a locking pin perpendicularly-fixed to its offset segment with the locking pin in alignment with the first hole of the offset segment of the first strap;

a centering pin perpendicularly located on the stem portion of the second strap with the centering pin in alignment with the second hole of the first strap;

a coil spring about the length of the centering pin urging the two metal straps into a first position, wherein the stem portions are in flat engagement with the locking pin extending through the aligned hole of the offset segment of the first strap, said two straps being moveable against the force of the spring into a second position, where the offset segments are spaced further apart and the locking pin moves out of the aligned hole of the first strap and away therefrom to provide a disengaging gap within the shackle area; and means for movably coupling the free ends of the strap stems together.

* * * * *